(12) United States Patent
Egerton et al.

(10) Patent No.: US 8,455,828 B1
(45) Date of Patent: Jun. 4, 2013

(54) INFRARED RADIATION DETECTORS USING BUNDLED CARBON NANOTUBES AND METHODS OF CONSTRUCTING THE SAME

(75) Inventors: Elwood J. Egerton, Longmont, CO (US); Ashok K. Sood, Brookline, MA (US)

(73) Assignee: Magnolia Optical Technologies, Inc., Woburn, MA (US)

( * ) Notice: Subject to any disclaimer, the term of this patent is extended or adjusted under 35 U.S.C. 154(b) by 0 days.

(21) Appl. No.: 13/103,323

(22) Filed: May 9, 2011

(51) Int. Cl.
*G01J 5/02* (2006.01)
(52) U.S. Cl.
USPC ..................................... 250/339.01; 250/340
(58) Field of Classification Search
USPC ........................ 250/338.1, 338.4, 339.01, 340
See application file for complete search history.

(56) References Cited

U.S. PATENT DOCUMENTS

| | | | |
|---|---|---|---|
| 6,706,402 | B2 | 3/2004 | Rueckes et al. |
| 2008/0251723 | A1 * | 10/2008 | Ward et al. ................. 250/338.4 |

FOREIGN PATENT DOCUMENTS

WO    WO 0103208 A1    1/2001

* cited by examiner

*Primary Examiner* — Mark R Gaworecki
(74) *Attorney, Agent, or Firm* — Loginov & Associates, PLLC; Keri E. Sicard; William A. Loginov

(57) ABSTRACT

Infrared (IR) radiation detecting and sensing systems using aligned or bundled carbon nanotubes and methods to making the same. In certain embodiments of the invention, it includes a substrate, aligned or bundled carbon nanotubes, first and second conducting interconnects each in electrical communication with the nanotubes. Bundled nanotubes can be tuned to increase the temperature coefficient of resistance to increase sensitivity to IR radiation. In addition bundled nanotubes are independent of Nyquist frequency limitations found in other IR sensors because of the lack of 1/f or flicker noise sources. These detectors can be fabricated on CMOS foundry wafers resulting in large format focal planes greater than 1000×1000 and pixel sizes only limited by photolithographic technologies. The increase in temperature coefficient of resistance claimed within results in IR detectors capable of NEDT of less than 10 mK at low cost.

23 Claims, 3 Drawing Sheets

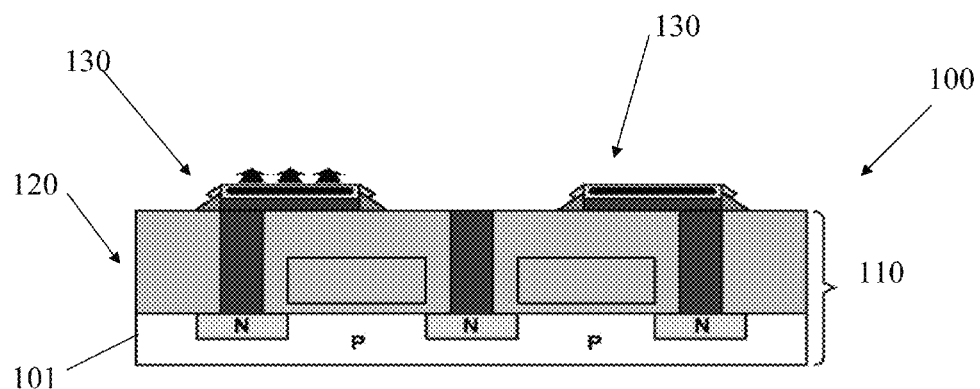
Fig. 1
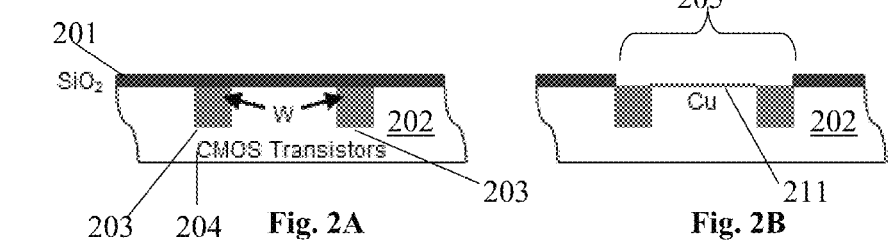
Fig. 2A   Fig. 2B
Fig. 2C   Fig. 2D
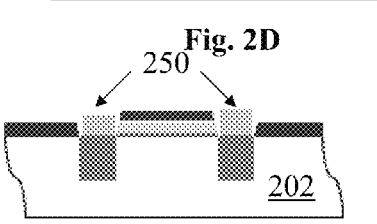
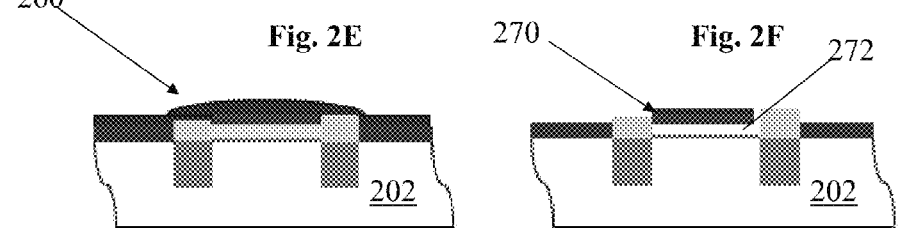
Fig. 2E   Fig. 2F
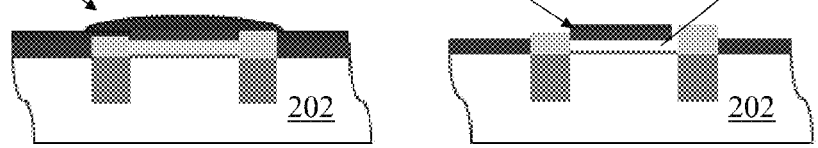
Fig. 2G   Fig. 2H

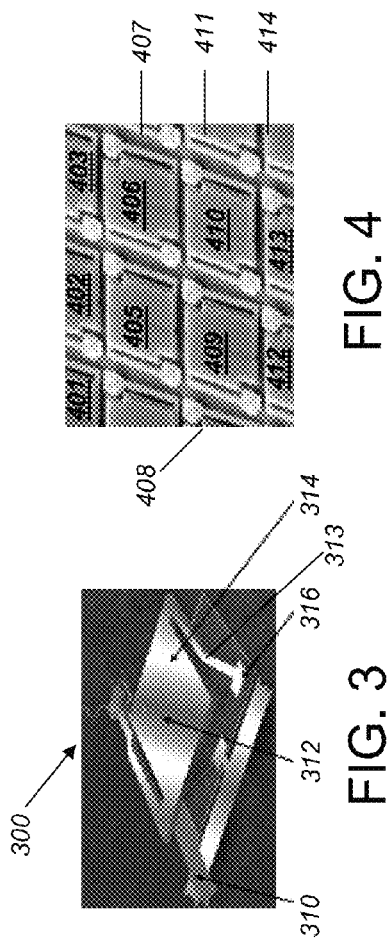
FIG. 3
FIG. 4
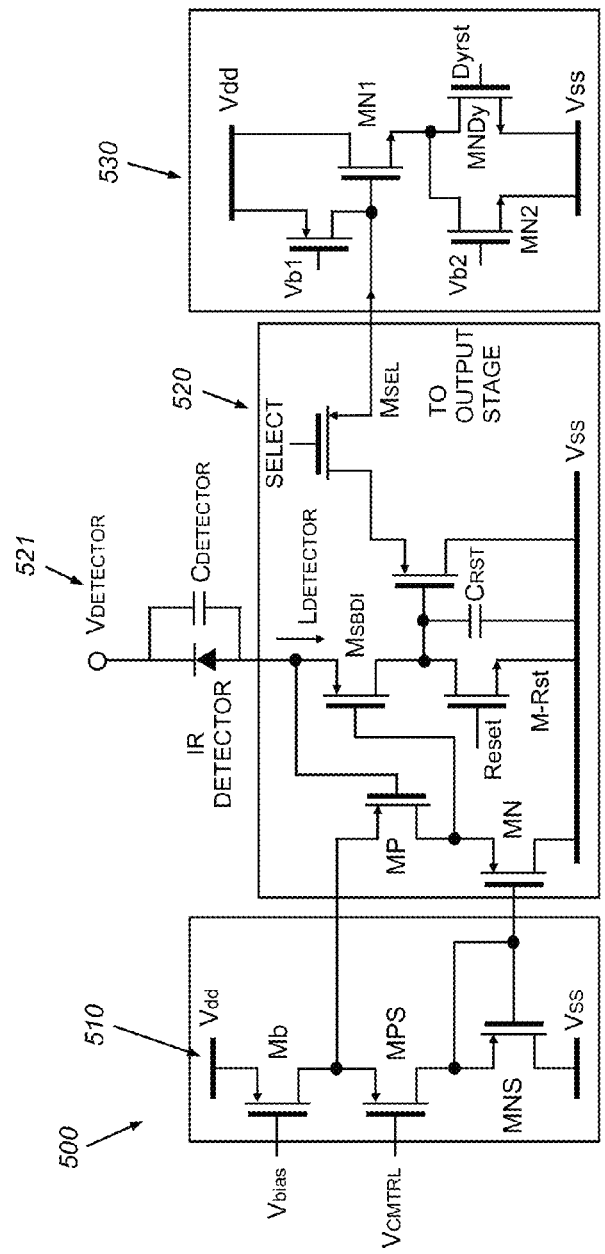
FIG. 5

INFRARED RADIATION DETECTORS USING BUNDLED CARBON NANOTUBES AND METHODS OF CONSTRUCTING THE SAME

FIELD OF THE INVENTION

The present application relates generally bundled nanotube fabrics and methods of making same.

BACKGROUND OF THE INVENTION

Photodetectors are an integral part of optical circuits and components (for example emitters, modulators, repeaters, waveguides or fibers, reflectors, resonators, detectors, IR Focal plane arrays, etc.) and are used for the sensing of electromagnetic radiation. There are several approaches to these devices. Photoconducting materials, typically semiconductors, have electrical properties that vary when exposed to electromagnetic radiation (i.e. light). One type of photoconductivity arises from the generation of mobile carriers (electrons or holes) during absorption of photons. For semiconducting materials, the absorption of a specific wavelength of light, hence photon energy, is directly proportional to the band gap of the material ($E_g$=hn=hc/l, where $E_g$ is the materials band gap, h is Plank's constant ($4.136 \times 10^{-15}$ eVs), c is the speed of light in a vacuum ($2.998 \times 10^{10}$ cm/s) and l is the wavelength of the radiation). If the band gap energy is measured in eV (electron Volts) and the wavelength in micrometers, the above equation reduces to $E_g$=1.24/l. A photodiode (i.e. p-n diode, p-i-n photodiode, avalanche photodiode, etc.) is the most commonly employed type of photoconductor.

Light detection is ideally suited for direct band gap semiconductors such as Ge, GaAs, etc.; however, indirect band gap semiconductors (where an additional phonon energy is required to excite an electron from the valence band to the conduction band), such as Silicon, are also used as photodetectors. Probably the most widely known type of photodetctor is the solar cell, which uses a simple p-n diode or Schottky barrier to detect impinging photons. Besides silicon, most photodetectors do not integrate with current microelectronics technology, usually detect only a specific wavelength (i.e. 1.1 mm for Si, 0.87 mm for GaAs, 0.414 mm for a-SiC and 1.89 mm for Ge), and require multiple detectors to detect a broad band of wavelengths (hence photon energy).

There are other types of photodetectors that do not rely on the generation of current through the excitation of electrons (or holes). One such type of detector is the bolometer. Bolometers operate by absorbing radiation, which in turn raises the temperature of the material and hence alters the resistance of the material. Bolometers can be constructed from either metallic, metallic-oxides or semiconducting materials such as vanadium oxide, amorphous silicon. Since bolometers detect a broad range of radiation above a few microns, bolometers are typically thermally stabilized to reduce the possibility of detection of blackbody radiation that is emitted from the detector material, which leads to a high background noise. IR microbolometer detectors and arrays don't require cooling to cryogenic temperatures unlike the other detector technologies discussed. Another type of non-photo-generated detector is the pyroelectric detector. Pyroelectric detectors operate by sensing induced surface charges that are related to changes in the internal dipole moment generated from temperature shifts in the material.

It is possible for IR and visible light to be detected from individual single-walled nanotubes (SWNTs). Carbon nanotubes possess discrete absorption peaks that correspond to specific photon energies. For useful background material, refer to U.S. Pat. No. 6,400,088. As described, the absorption peaks of the carbon nanotubes correlate directly to the diameter of the carbon nanotube.

Typical band-gaps for carbon nanotubes (CNTs) range from 0.6-1.2 eV, depending on the diameter of the CNT, where the band gap is proportional to the inverse diameter of the nanotube. These energies correlate to the nanotubes ability to detect radiation in the near IR range. Since nanotubes can also generate heat and phonons by several processes (injection of electrons, impinging with radiation, etc.), a CNT fabric is also ideally suited as an IR detector.

The current state of the art micro bolometer utilizes vanadium oxide as the element which changes impedance for incoming IR radiation. Typically 2% per degree Centigrade is the highest thermal coefficient of resistance achievable. This performance is restricted by 1/f noise and the basic physical properties of the vanadium oxide (VOx) film. The VOx based micro bolometer is fabricated on top of the CMOS readout circuit, which provides a cost benefit.

There is a need for light detectors that use nanotubes and methods of making the same which addresses the issues described above.

SUMMARY OF THE INVENTION

The present invention overcomes the disadvantages of the prior art by providing a light detector includes a bundled nanotube article in electrical communication with a first and a second contact; and a detection circuit in electrical communication with the first and second contacts. The detection circuit provides electrical outputs for sufficient light detection from the nanotube article in the proximity of the predefined region by use of preamplification.

In accordance with the illustrative embodiment, the predefined region where bundled single wall or multiwall carbon nanotube fabric is suspended between the electrodes or lies on a cantilever beam that provides thermal isolation from the surrounding environment.

In accordance with the illustrative embodiment, the predefined region is between two electrical contacts. These electrical contacts provide electrical communication but also are designed for maximum thermal isolation.

In accordance with the illustrative embodiment, light detection can be integrated with semiconductor circuits including CMOS circuits which provide pixel array x-y controls, pre-amplification of the modulated resistance signal from the IR detector and the conversion of the analog signal to digital.

In accordance with the illustrative embodiment, the bundled carbon nanotube fabric films increase the temperature coefficient of resistance from state of the art of 0.025 per degree Centigrade to in excess of 0.04% per degree centigrade In accordance with the illustrative embodiment, aligned or bundled carbon nanotubes detects light by resistance changes in the fabric due to heating.

In accordance with the illustrative embodiment, the IR detector no longer suffers from the Nyquist frequency limitation. This is due to the fact that the Nyquist frequency limitation is due to the presence of 1/f or flicker noise. Based on measurements conducted by the inventors, bundled carbon nanotubes exhibit non measureable noise sources of these types. With the obtainment of > approximately 4% per degree kelvin temperature coefficient of resistance (TCR), noise equivalent delta temperature (NEDT) of less than 5 mK will be achievable. In optical systems with Fluoride, the elimination of Nyquist limited behavior will be a vast improvement to IR detection systems performance.

BRIEF DESCRIPTION OF THE DRAWINGS

The invention description below refers to the accompanying drawings, of which:

FIG. 1 is a schematic diagram of a detecting element having a bundled carbon nanotube fabric sensing element fabricated on a generic CMOS wafer process wherein the readout circuitry is fabricated, according to an illustrative embodiment;

FIG. 2A is a schematic diagram of the resulting structure after a first step is performed in fabrication of a bundled carbon nanotube IR detector, in which a film is deposited on a substrate and standard photolithography creates a hole over the tungsten (W) plugs, according to the illustrative embodiment;

FIG. 2B is a schematic diagram of the resulting structure after another step is performed in the fabrication of the IR detector, in which a thin film of Cu is deposited, according to the illustrative embodiment;

FIG. 2C is a schematic diagram of the resulting structure after another step is performed in the fabrication of the IR detector, in which a layer of amorphous silicon is deposited, according to the illustrative embodiment;

FIG. 2D is a schematic diagram of the resulting structure after another step is performed in the fabrication of the IR detector, in which the layer of amorphous silicon is planarized using chemical-mechanical polishing, according to the illustrative embodiment;

FIG. 2E is a schematic diagram of the resulting structure after another step is performed in the fabrication of the IR detector, in which contact holes are provided through the amorphous silicon and silicon oxide layers, thereby clearing the material down to the underlying tungsten (W) plus, according to the illustrative embodiment;

FIG. 2F is a schematic diagram of the resulting structure after another step is performed in the fabrication of the IR detector, in which standard CMOS interconnect metallurgy is deposited, according to the illustrative embodiment;

FIG. 2G is a schematic diagram of the resulting structure after another step is performed in the fabrication of the IR detector, in which suspended carbon nanotubes are deposited, according to the illustrative embodiment;

FIG. 2H is a schematic diagram of the resulting IR detector after the final step is performed in the fabrication of the IR detector, in which the bundled carbon nanotube fabric is masked off to create the image detector design desired and the amorphous silicon in the cavity is etched, according to the illustrative embodiment;

FIG. 3 is a perspective view of the fully assembled carbon nanotube based microbolometer, in accordance with an illustrative embodiment;

FIG. 4 is a top view of an array of carbon nanotube based microbolometers, in accordance with the illustrative embodiments;

FIG. 5 is a schematic diagram of the CMOS readout circuit for the aligned bundled carbon nanotube IR detector, in accordance with the illustrative embodiments.

DETAILED DESCRIPTION

Figure 6:
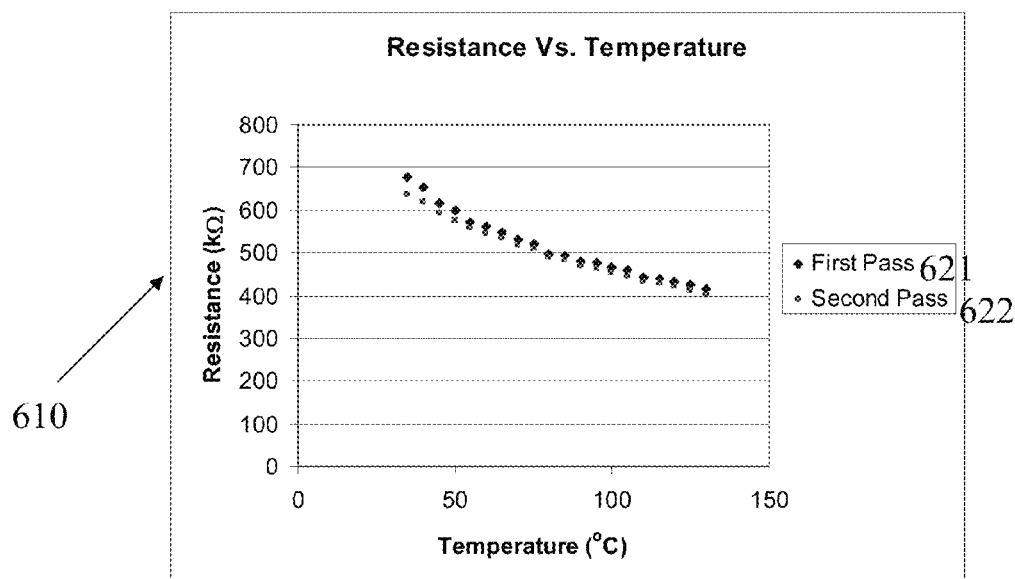
FIG. 6 is a graphical diagram of the measured film resistance of bundled carbon nanotube fabric versus temperature, according to the illustrative embodiment.

Fabrics including bundled carbon nanotubes suspended over gaps (for example, approximately 50-250 nm) can be employed as Infrared (IR) radiation detectors. In addition, the application of bundled carbon nanotubes on a thermally isolated cantilever beam can be employed as an IR radiation detector among other devices and users. One possible technique that can be used to detect electromagnetic radiation is a resistive type micro-bolometer that is used to detect electromagnetic radiation. This detects radiation because its electrical resistance changes as its temperature rises due to the absorption of electromagnetic radiation.

The carbon nanotube IR detectors have several important and unique features that are not available with existing technologies. First, arrays of these nanotube light detectors can be formed using patterning technology at minimum dimensions of the lithography node used or dictated by the demands of the optical imaging system. It is possible to create 25, 17, or 8, or even less, micron square detectors limited only by photolithography techniques.

The various illustrative embodiments of the invention allow integration at a level of one light detector per ten or less transistors at the minimum dimension of a given lithography node or the integration of large arrays that are addressed by CMOS pre-amplification or readout and logic circuits. Previously only discrete components, such as silicon p-n diodes, could be used as light detectors for optoelectronic circuits. Other types of detectors require complex and difficult fabrication techniques such as flip-chip processes to integrate with silicon semiconductor technology. Because CNT light sensors can be integrated to form VLSI arrays, thus enabling optical interconnects with one light detector per transistor (or waveguide, depending on function), the fabrication of ultradense optical circuits is possible.

FIG. 1 shows a schematic diagram of an IR detector having a bundled carbon nanotube fabric sensing element fabricated on a generic CMOS wafer. The IR detector incorporates a bundled carbon nanotube fabric sensing element for performing the infrared detection. The IR detector 100 includes a conventional P-N junction substrate 101, which is part of the overall CMOS logic 110. There is a film 120 deposited on the substrate 101 as well as the nanotube IR sensors 130, for performing the IR detection. The IR detector 101 is fabricated in accordance with the procedures outlined in FIGS. 2A through 2H.

The layers can have a thickness of approximately 1 nm or less (i.e., the thickness of a given nanotube), or can be composed of several layers of overlapping nanotubes to create a multilayered film of >> approximately 10 nm. The nanotube fabric can be grown or deposited on a surface, as described above, to form a contiguous film of a given density. This film can then be patterned to a minimum feature size of approximately 1 nm, corresponding to a single nanotube left in the article. More typically, the lower dimension sizes of the nanotube film are a consequence of lithographic technology limitations and not any limitations inherent in the preferred embodiments of the invention. After patterning, the nanotube film can be further integrated with metal interconnects and dielectric passivation layers to create a circuit element.

Light detectors can be constructed using suspended or non-suspended nanotube-based fabrics in combination with appropriate substrates. Fabrication techniques to develop such horizontally- and vertically-disposed fabrics and devices composed of nanotube fabrics which comprise redundant conducting nanotubes may be created via CVD, or by room temperature operations as described herein. For useful background material on fabrication of carbon nanotubes, refer to U.S. Pat. No. 6,706,402, and WO 01/03208, which are expressly incorporated by reference herein. Such detectors can be part of a scheme involving signal transmission or use in a display.

Reference is now made to FIGS. 2A through 2H, showing the various stages of the fabrication procedure for an IR detector incorporating bundled carbon nanotubes. As shown in FIG. 2A, using standard CMOS microelectronics processing techniques, a silicon oxide film 201 is deposited on the substrate 202 and a standard photolithography method is used to create a hole 205 (as shown in FIG. 2B) over the tungsten (W) plugs 203, which serve as interconnects to the underlying CMOS pre-amplification circuitry 204. The next step, as shown in FIG. 2B, is to use electron beam evaporation or Direct current sputtering to deposit a thin film of Cu 211 which will serve as IR photon reflector.

As shown in FIG. 2C, in the next step of the fabrication process a layer of amorphous silicon 220 is deposited and planarized using chemical-mechanical polishing to result in the amorphous silicon 230 of FIG. 2D. The next step is to use standard photolithography techniques using a photoresist stencil and reactive ion etching to etch contacts holes 240 through the amorphous silicon and silicon oxide layers clearing the material down to the underlying tungsten plugs 203 which serve as interconnects to the underlying CMOS circuitry, as shown in FIG. 2E. The next step is to use direct current sputtering to deposit standard CMOS interconnect metallurgy, aluminum—copper thin films 250, as shown in FIG. 2F. Standard photolithographic/dry etch techniques are used to delineate the interconnect structures, as also shown in FIG. 2F. The next step as shown in FIG. 2G is to deposit carbon nanotubes 260 in aqueous and non-aqueous casting solutions. During this process of CNT suspension, optimization of bundle behavior results from optimization of surfactant agents to achieve optimal bundle behavior. Once the optimal behavior has been determined the CNT laden solution will either be sprayed on or the use of photoresist apply, dry and bake techniques will be undertaken as shown in FIG. 2G. The final steps are to mask off the CNT bundled fabric and use standard photolithographic methods to create the image the detector design as desired. Finally, as shown in FIG. 2H, using XeFl2 (Xenon Difluoride) etching or another appropriate technique known to those skilled in the art, the amorphous silicon in the cavity is etched and the cavity is created, the device is fully fabricated.

According to the illustrative embodiment, light detecting elements can have a suspended region 270 of nanofabric overlying a gap 272, above substrate material 201. The gap is created using techniques as described herein. Second substrate material 202 may be an insulator such as one listed above and may be the same insulating material as 201 or second substrate material 202 may be a semiconductor (such as, but not limited to, Si (single crystal, polycrystalline and amorphous), Ge, SiGe, SiC, Diamond, GaN, GaAs, GaP, AlGaAs, InP, GaP, CdTe, AlN, InAs, $Al_xIn_{1-x}P$, and other III-V and II-VI semiconductors) or a conductor (such as, but not limited to, Al, Cu, W, Al(<1% Cu), Co, Ti, Ta, W, Ni, Mo, Pd, Pt, TiW, Ru, $CoSi_x$, $WSi_2$, $TiSi_x$, TaN, TiN, TiAlN, RuN, RuO, PtSi, $Pd_2Si$, $MoSi_2$, $NiSi_x$). The substate material systems can be chosen for circuitry technologies considerations, the bundled carbon nanotube fabric and associated microbolometer structure processing are compatible with all of these materials. The suspended region of nanofabric 201 defines the electromagnetic sensing region of the detecting element 201.

The light detection from the detecting element 201 is controlled by driving circuitry 130.

Light impinged on the open area of these bundled carbon nanotube fabrics causes the generation of heat in the fabric, such as a bolometer.

Suspended bundled carbon nanotubes are ideal structures for monolayered fabrics, which have a high porosity. Since the substrate may influence the detection of radiation, the suspended region should diminish any disadvantageous substrate thermal isolation effects.

Under certain embodiments of the invention, the sensing articles may be made from a bundled nanotube film. Carbon nanotubes with tube diameters as little as 1 nm are electrical conductors that are able to carry extremely high current densities. They also have the highest known thermal conductivity, and are thermally and chemically stable.

Creation of suspended nanotube-based detector elements is similar to fabrication of suspended nanotube-based memory elements, the description of their architecture is brief. For useful background information on creation of suspended nanotube based detector elements, refer to U.S. Pat. No. 6,706,402, and to WO 01/03208, which are expressly incorporated by reference herein.

The illustrative embodiments generally employ a fabric that is made of nanotubes of the same type, e.g., all single-walled. However, it is expressly contemplated that the fabrics can be composed of all multi-walled structures or of a combination of single- and multi-walled structures, without departing from the scope and the teachings herein.

Reference is now made to FIG. 3, showing a perspective view of a fully assembled carbon nanotube microbolometer, according to an illustrative embodiment. A carbon nanotube based microbolometer structure 300 is shown, having readout locations 310. The structure 300 includes a carbon nanotube fabric 312 suspended above the substrate 313, in accordance with the techniques described herein and readily apparent to those having ordinary skill. The thermally isolated cantilever structure 314 is also shown, as well as the connection to tungsten (W) plugs 316. An array of carbon nanotube based microbolometers are shown in the top view of FIG. 4, in accordance with the illsupratiev embodiments. The array 400 of microbolometers includes a plurality of microbolometers 401, 402, 403, 404, 405, 406, 407, 408, 409, 410, 411, 412, 413, and 414.

FIG. 5 is a schematic diagram of the CMOS readout circuit for the aligned bundled carbon nanotube IR detector in accordance with the illustrative embodiments. As shown in the diagram 500, there is a common half circuit 510 operatively connected to a unit cell circuit 520 which includes the IR detector 521. A dynamic discharging output stage circuit 530 is operatively connected to the unit cell circuit 520 to define the overall CMOS readout circuit 500.

FIG. 6 is a graphical diaghram of the measured film resistance of the bundled carbon nanotube fabric versus the temperature, according to the illustrative embodiments. As described hereinabove, the electrical resistance of the microbolometers changes as the temperature rises due to the absorption of electromagnetic radiation in the fabric. This is illustrated in the graphical diagram 610 of FIG. 6. As shown, during both the first pass 621 and the second pass 622, as the temperature increases, the resistance of the microbolometer changes. Accordingly, this allows the structure to be employed as an IR detector in accordance with the illustrative embodiments.

The teachings herein can be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the illustrative embodiments can include additional layers to perform further functions or enhance existing, described functions. Likewise, the electrical connectivity of the cell structure with other cells in an array and/or an external conduit is expressly contemplated and highly variable within ordinary skill. More generally, while some ranges of layer thickness and illustrative materials are described herein, these ranges are highly variable. It is expressly contemplated that additional layers, layers having differing thicknesses and/or material choices can be provided to achieve the functional advantages described herein. In addition, directional and locational terms such as "top", "bottom", "center", "front", "back", "on", "under", "above", and "below" should be taken as relative conventions only, and not as absolute. Furthermore, it is expressly contemplated that various semiconductor and thin films fabrication techniques can be employed to form the structures described herein. Accordingly, this description is meant to be taken only by way of example, and not to otherwise limit the scope of this invention.

What is claimed is:

1. An Infrared (IR) detector comprising:
a substrate;
a thin film of bundled carbon nanotubes suspended over the substrate and between electrical contacts;
first and second conductive contacts in electrical communication with the thin film of bundled nanotubes;
a layer of amorphous silicon on the substrate;
means for forming a cavity in the amorphous silicon layer to thereby create a gap between the bundled carbon nanotube fabric and the substrate such that the bundled carbon nanotube fabric is suspended above the substrate, thereby fabricating the IR detector;
wherein the thin film of bundled carbon nanotubes is tuned to be sensitive to IR radiation in the micron band of 1 to 12 microns and the exposure of IR radiation induces a change in impedance between the first and second conductive terminals which is sensed by CMOS readout circuitry.

2. The IR detector of claim 1 further comprising sensing circuitry for detecting changes in input impedance using the CMOS readout circuitry.

3. The IR detector of claim 1 wherein the thin film of bundled carbon nanotubes is deposited on the substrate having an insulating layer comprised of dielectric material with a cantilever beam composed of silicon nitride, which si suspended over a channel, thereby providing thermal isolation from surrounding environments.

4. The IR detector of claim 1 wherein the thin film of bundled carbon nanotubes is composed of single wall carbon nanotubes having diameters corresponding to a tuned IR response wavelength.

5. The IR detector of claim 1 wherein the thin film of bundled carbon nanotubes is composed of multi wall carbon nanotubes having diameters corresponding to a tuned IR response wavelength.

6. The IR detector of claim 1 wherein the thin film of bundled carbon nanotubes is composed of single wall carbon nanotubes and multi wall carbon nanotubes having diameters corresponding to a tuned IR responsive wavelength.

7. The IR detector of claim 1 wherein the carbon nanotubes are deposited on the substrate in a horizontal orientation using one of a spin on process using centrifugal forces or a spray on technique.

8. The IR detector of claim 1 wherein the means for forming a cavity includes means for etching the amorphous silicon.

9. The IR detector of claim 8 wherein the means for forming a cavity includes means for etching the amorphous silicon using Xenon difluoride ($XeF_2$) etching techniques.

10. An Infrared (IR) detector comprising:
a thin film of bundled carbon nanotubes suspended between electrical contacts;
first and second conductive terminals in electrical communication with the thin film of bundled nanotubes;
wherein the thin film of bundled carbon nanotubes is tuned to be sensitive to IR radiation in the micron band of 1 to 12 microns and the exposure of IR radiation induces a change in impedance between the first and second conductive terminals which is sensed by CMOS readout circuitry; and
wherein the thin film of bundled carbon nanotubes is tuned to increase sensitivity of the IR detector by increasing the density of the bundled carbon nanotubes, which thereby increases the temperature coefficient of resistance (TCR) to excess of 4% per degree centigrade, thereby resulting in a Noise Equivalent Delta Temperature (NEDT) of less than 10 mK.

11. An Infrared (IR) detector comprising:
a thin film of bundled carbon nanotubes suspended between electrical contacts;
first and second conductive terminals in electrical communication with the thin film of bundled nanotubes;
wherein the thin film of bundled carbon nanotubes is tuned to be sensitive to IR radiation in the micron band of 1 to 12 microns and the exposure of IR radiation induces a change in impedance between the first and second conductive terminals which is sensed by CMOS readout circuitry; and
wherein the carbon nanotube is a polymer fabric having a thermal coefficient of resistance (TCR) in the range of 1% per degree centigrade and up to 6% per degree centigrade.

12. An Infrared (IR) detector comprising:
a thin film of bundled carbon nanotubes suspended between electrical contacts;
first and second conductive terminals in electrical communication with the thin film of bundled nanotubes;
wherein the thin film of bundled carbon nanotubes is tuned to be sensitive to IR radiation in the micron band of 1 to 12 microns and the exposure of IR radiation induces a change in impedance between the first and second conductive terminals which is sensed by CMOS readout circuitry; and
wherein the carbon nanotubes are aligned in bundles by one of: use of electromagnetic field to align the carbon tubes, use of nanogroves sprayed with a hydrophobic compound which aligns the nanotubes, or through modification of surfactant in an aqueous solution of nanotubes to maximize nanotube clumping.

13. The IR detector of claim 12 wherein the hydrophobic compound comprises one of saline and a derivative thereof, including aminopropyltriethoxysilane.

14. A method for fabricating an infrared (IR) detector, the method comprising the steps of:
   depositing a silicon oxide film on a substrate;
   create a hole over a tungsten plug provided in the substrate and disposed below the silicon oxide film;
   depositing a thin film of copper on the substrate so that the copper film serves as an IR photon reflector;
   depositing a layer of amporphous silicon on the substrate and planarizing the layer of amorphous silicon;
   etch contact holes through the amorphous silicon to clear the amorphous silicon layer and the copper film layer down to a tungsten plug disposed in the substrate;
   deposit a CMOS interconnect thin films in the hole above the tungsten plug and delineate interconnect structures;
   depositing a layer of bundled carbon nanotubes on the substrate; and
   etching a cavity in the amorphous silicon layer to thereby create a gap between the bundled carbon nanotube fabric and the substrate such that the bundled carbon nanotube fabric is suspended above the substrate, thereby fabricating the IR detector.

15. The method of claim 14 wherein the silicon oxide film is deposited using standard CMOS microelectronics processing techniques.

16. The method of claim 14 wherein the thin film of copper is deposited using one of electron bean evaporation and direct current sputtering.

17. The method of claim 14 wherein the interconnect structures are delineated using standard photolithographic and dry etch techniques.

18. The method of claim 14 wherein the cavity is etched in the amorphous silicon using Xenon difluoride ($XeF_2$) etching techniques.

19. An infrared (IR) detector comprising:
   a substrate having tungsten plugs deposited therein and having a CMOS readout circuitry operatively connected thereto;
   a layer of silicon oxide deposited on the substrate and the layer of silicon including a hole over the tungsten plugs;
   a layer of copper is deposited on the layer of silicon oxide, the layer of copper acting as an IR photon reflector;
   a layer of amorphous silicon deposited on the substrate and the layer of copper, the layer of amorphous silicon being further planarized;
   at least one contact hole etched through the layer of amorphous silicon so as to clear the at least one contact hole down to an underlying tungsten plug;
   a layer of CMOS interconnect deposited in the at least one hole;
   a layer of carbon nanotubes deposited on the substrate; and
   wherein the layer of carbon nanotubes are suspended over the substrate via an etching technique that creates a gap between the layer of carbon nanotubes and the underlying substrate, thereby generating the IR detector.

20. The IR detector of claim 19 wherein the hole is created using a photolithography procedure.

21. A method for fabricating an infrared (IR) detector, the method comprising the steps of:
   providing a substrate;
   forming first and second spaced apart conductive terminals in the substrate;
   forming a thin metal film on the substrate so that the metal film serves as an IR photon reflector layer;
   depositing a layer of amorphous silicon on the substrate;
   forming a CMOS interconnect thin film above the conductive terminals and delineate interconnect structures;
   depositing a layer of bundled carbon nanotubes on the substrate; and
   etching a cavity in the amorphous silicon layer to thereby create a gap between the bundled carbon nanotube fabric and the substrate such that the bundled carbon nanotube fabric is suspended above the substrate, thereby fabricating the IR detector.

22. The method of claim 21 wherein the interconnect structures are delineated using standard photolithographic and dry etch techniques.

23. The method of claim 21 wherein the cavity is etched in the amorphous silicon using Xenon difluoride ($XeF_2$) etching techniques.

* * * * *